United States Patent [19]

Tandon et al.

[11] Patent Number: 5,081,536
[45] Date of Patent: Jan. 14, 1992

[54] IMAGE SENSOR ARRAY USING TWO STAGE TRANSFER HAVING IMPROVED UNIFORMITY

[75] Inventors: Jagdish C. Tandon, Fairport; Frederick O. Hayes, Ontario, both of N.Y.

[73] Assignee: Xerox Corporation, Stamford, Conn.

[21] Appl. No.: 632,814

[22] Filed: Dec. 24, 1990

[51] Int. Cl.⁵ .................. H04N 5/335; H04N 3/14
[52] U.S. Cl. ..................... 358/213.31; 358/213.27; 358/213.23
[58] Field of Search ............. 358/213.31, 213.29, 358/213.27, 213.18, 213.16, 213.13, 213.23; 357/24 LR; 250/211 J, 208.1; 377/60–63

[56] References Cited

U.S. PATENT DOCUMENTS

| | | | |
|---|---|---|---|
| 4,274,113 | 6/1981 | Ohba et al. | 358/213.31 |
| 4,369,469 | 1/1983 | Endo et al. | 358/213.31 |
| 4,644,572 | 2/1987 | Lambeth | 377/60 |
| 4,731,665 | 3/1988 | Hashimoto et al. | 358/213.27 |
| 4,737,854 | 4/1988 | Tandon et al. | 358/213.31 |
| 4,835,404 | 5/1989 | Sugawa et al. | 358/213.27 |

OTHER PUBLICATIONS

"A Low-Noise CCD Input with Reduced Sensitivity to Threshold Voltage", Emmons et al., Texas Instruments, Inc., pp. 233-235, Dec. 1974.

"Charge-Coupled Devices and Systems", edited by M. J. Howes et al., published by J. Wiley & Sons, pp. 70-72.

Primary Examiner—James J. Groody
Assistant Examiner—Glenton B. Burgess
Attorney, Agent, or Firm—Frederick E. McMullen

[57] ABSTRACT

A linear image sensor array and process having a two stage transfer circuit where in order to reduce non-uniformities between the photosite cells of the array resulting from difference transistor thresholds, the bias charge is injected between the first and second transistors of the two stage transfer circuit, with the first transistor function as a metering gate for bias charge injection.

8 Claims, 4 Drawing Sheets

IMAGE SENSOR ARRAY USING TWO STAGE TRANSFER HAVING IMPROVED UNIFORMITY

The invention relates to an image sensor array, and more particularly, to a system for improving sensor array uniformity by canceling cell-to-cell performance variations in the sensor chips due to transistor threshold mismatches.

Image sensor arrays typically comprise a linear array of photosites which raster scan an image bearing document and convert the microscopic image areas viewed by each photosite to image signal charges. Following an integration period, the image signal charges are amplified and transferred to a common output line or bus through successively actuated multiplexing transistors.

In the scanning process, bias and reset charges are applied to each photosite cell in a predetermined time sequence during each scan cycle. Where a two stage transfer circuit is provided with each cell for transferring the image signal charges from the photosites, the bias charge has heretofore been applied to each photosite directly through a bias charge injection transistor coupled to a node between the photosite and the input to the two stage transfer circuit. However, any differences in the thresholds of the bias charge injection transistor and the first transistor of the two stage transfer circuit in one cell from the thresholds of the transistors in the other cells resulted in objectionable non-uniformities across the array.

In the prior art, U.S. Pat. No. 4,737,854 to Tandon et al, assigned to Xerox Corp., the assignor of the present application, discloses an image sensor array with two-stage transfer employing two transistors in series for transferring the image signal charges developed on the array photodiodes to a source follower for later transfer to a common output line by a multiplexing transistor. A publication entitled "A Low-Noise CCD Input With Reduced Sensitivity to Threshold Voltage" by Emmons et al (Technical Digest of International Electron Devices Meeting, pp. 233-235, December 1974) discloses a CCD input structure in which the injected charge is obtained from the differences between two voltage levels at a capacitive node with both levels set using the same FET structure to cancel threshold differences. "Charge-coupled Devices and Systems", edited by M.J. Howes et al and published by John Wiley & Sons, pp. 70-72 further discusses and refers to the aforecited Emmons et al article (identified as citation #46 in the Wiley & Sons publication).

In contrast, the present invention provides a process for reducing non-uniformities at the output of image sensor chips when injecting bias charge onto the array of sensors resulting form transistor threshold mismatches, in which the sensor chips have an array of sensors; a common output bus to which the image charges accumulated by the sensors during an integration period are transferred to; and a two stage transfer circuit coupling each of the sensors on a chip with the output bus each having first and second transistors disposed in series with one another, and an amplifier between the transistor circuit and the output bus for amplifying the image charges output by the sensors, comprising the steps of: providing a bias charge for application to a node between the first and second transistors of the two stage transfer circuits for use in setting the bias charge on the sensors; concurrently applying a bias charge transfer pulse to the first transistor of each of the two stage transfer circuits so that the first transistors function as metering gates to inject a limited amount of the bias charge voltage on the sensors independently of the first transistors threshold voltages; applying a reset voltage to a node between the second transistor and the amplifier of each of the two stage transfer circuits at the input of the amplifiers to reset the amplifiers for transfer of the image signal charges from the sensors to the amplifiers; and thereafter applying an image signal charge transfer pulse having an amplitude different from the amplitude of the bias charge transfer pulse to the first and second transistors of the two stage transfer circuits to pass the image signal charges accumulated on the sensors to the amplifiers for amplification and transfer to the output bus.

The present invention further provides a sensor array with improved uniformity and reduced cell-to-cell variations resulting from transistor threshold mismatches, comprising the combination of: an array of sensors; a common output bus to which the image signal charges accumulated by the sensors during an integration preiod are transferred to; a two stage transfer circuit coupling each of the sensors with the output bus, the transfer circuit having first and second transistors disposed in series with one another; amplifier means between the second transistor and the output bus for amplifying the image signal charges output by the sensors; first means providing a bias charge for application to a node between the first and second transistors of the two stage transfer circuits for use in setting the bias charge on the sensors; second means providing a bias charge transfer pulse to the first transistor of each of the two stage transfer circuits so that the first transistors function as metering gates to inject a limited amount of the bias charge on the sensors independently of the first transistors threshold voltages; third means providing a reset voltage to a node between the second transistor and the amplifier of each of the two stage transfer circuits to reset the amplifiers for transfer of the image signal charges from the sensors to the amplifiers following application of the bias charge; and fourth means for subsequently applying an image signal charge transfer pulse to the first and second transistors of the two stage transfer circuits to pass the image signal charges accumulated on the sensors to the amplifiers for amplification and transfer to the output bus, the image signal charge transfer pulse applied by the fourth means being different than the bias charge transfer pulse provided by the second means.

IN THE DRAWING

Figure 1:
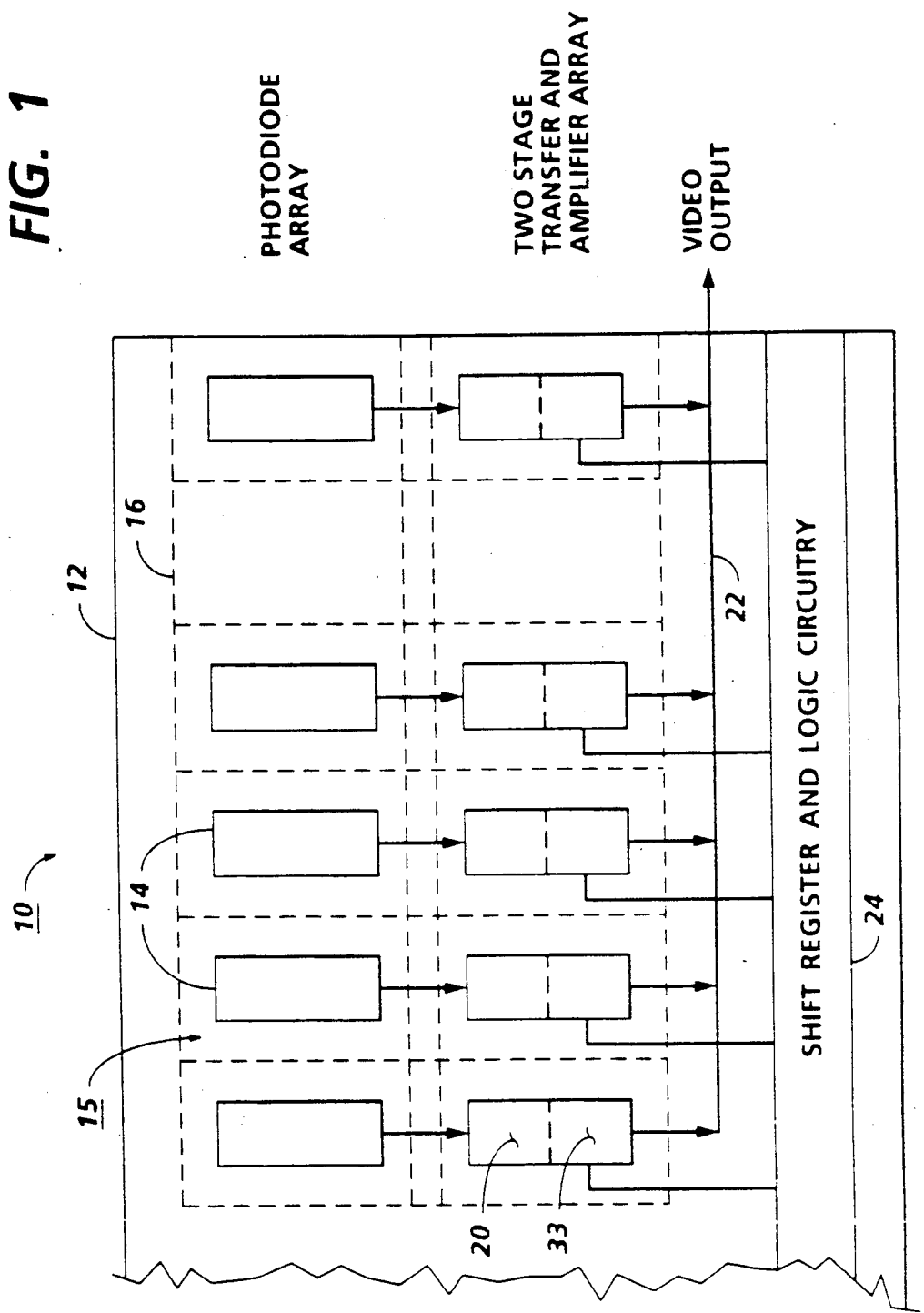
FIG. 1 is a schematic view of an image scanning array having an array of photosite cells, each cell having a photodiode with two stage transfer circuit and amplifier for transferring image signal charges from the photodiodes to a common output bus and incorporating the uniformity enhancing features of the present invention.

Referring to FIG. 1, there is shown the image sensor array with two stage transfer, designated generally by the numeral 10, of the type to which the present invention is directed. Image sensor array 10 includes a base or chip 12 of silicon with a plurality of photosites in the form of photodiodes 14 thereon. Photodiodes 14 are in closely spaced juxtaposition with one another on chip 12 in a linear array or row 16. Several smaller arrays such as array 10 can be abutted together end to end with one another to form a longer array, i.e. a full width or contact array, with spacing between the photodiodes at the butted ends the same as the spacing between the photodiodes inside the chip thereby maintaining photodiode pitch across the entire full width of the composite array.

While photodiodes 14 are shown and described herein, other photosite types such as amorphous silicon or transparent electrode MOS type photosites may be envisioned. Further, while a one dimensional sensor array having a single row 16 of photodiodes 14 is shown and described herein, a two dimensional sensor array with plural rows of photodiodes may be contemplated.

Each photodiode 14 has a two stage transfer circuit 20 associated therewith which together with the photodiode and an amplifier 33 form a photosite cell 15 at the array front end. In each cell 15, the image signal charge from the photodiode is transferred by circuit 20 to amplifier 33 where the image signal charge from photodiode 14 is amplified to bring the image signal charge to a desired potential level prior to transferring the charge to a common video output line or bus 22. Suitable shift register and logic circuitry 24 timing control signals $\Phi_{PIXEL}$ for connecting each pixel cell 15 to bus 22 in the proper timed sequence.

Image sensor array 10 may for example be used to raster scan a document original, and in that application, the document original and the sensor array 10 are moved or stepped relative to one another in a direction (i.e., the slow scan direction) that is normally perpendicular to the linear axis of array 10. At the same time, the array scans the document original line by line in the direction (i.e., the fast scan direction) parallel to the linear axis of the array. The image line being scanned is illuminated and focused onto the photodiodes 14. During an integration period, a charge is developed on each photodiode proportional to the reflectance of the image area viewed by each photodiode. The image signal charges are thereafter transferred by two stage transfer circuits 20 via amplifier 33 to output bus 22 in a predetermined step by step timed sequence.

In the aforecited U.S. Pat. No. 4,737,854, non-uniformities in the transfer circuits may, however, occur as a result of mismatches between the thresholds of the transistor pairs used to inject the bias charge onto the photodiodes 14. This occurs because the amount of bias charge injected depends on the threshold voltages of the transistors and on the amplitudes of the applied clock signals. Since the threshold voltages of the transistor pairs used for this purpose can vary from location to location on the chip, the amount of charge injected can also vary. This results in undesired non-uniformities at the output of the sensor array.

To obviate the effect of different transistor threshold voltages and enhance uniformity, the present invention injects the bias charge voltage between the transistor pairs and utilized the first transistor in the two stage transfer circuit 20 as a controlled metering gate as will appear.

In the ensuing description, all transistors shown are N-channel type. However, P-channel transistors may instead be used with appropriate voltage level changes as will be understood.

Figure 2:
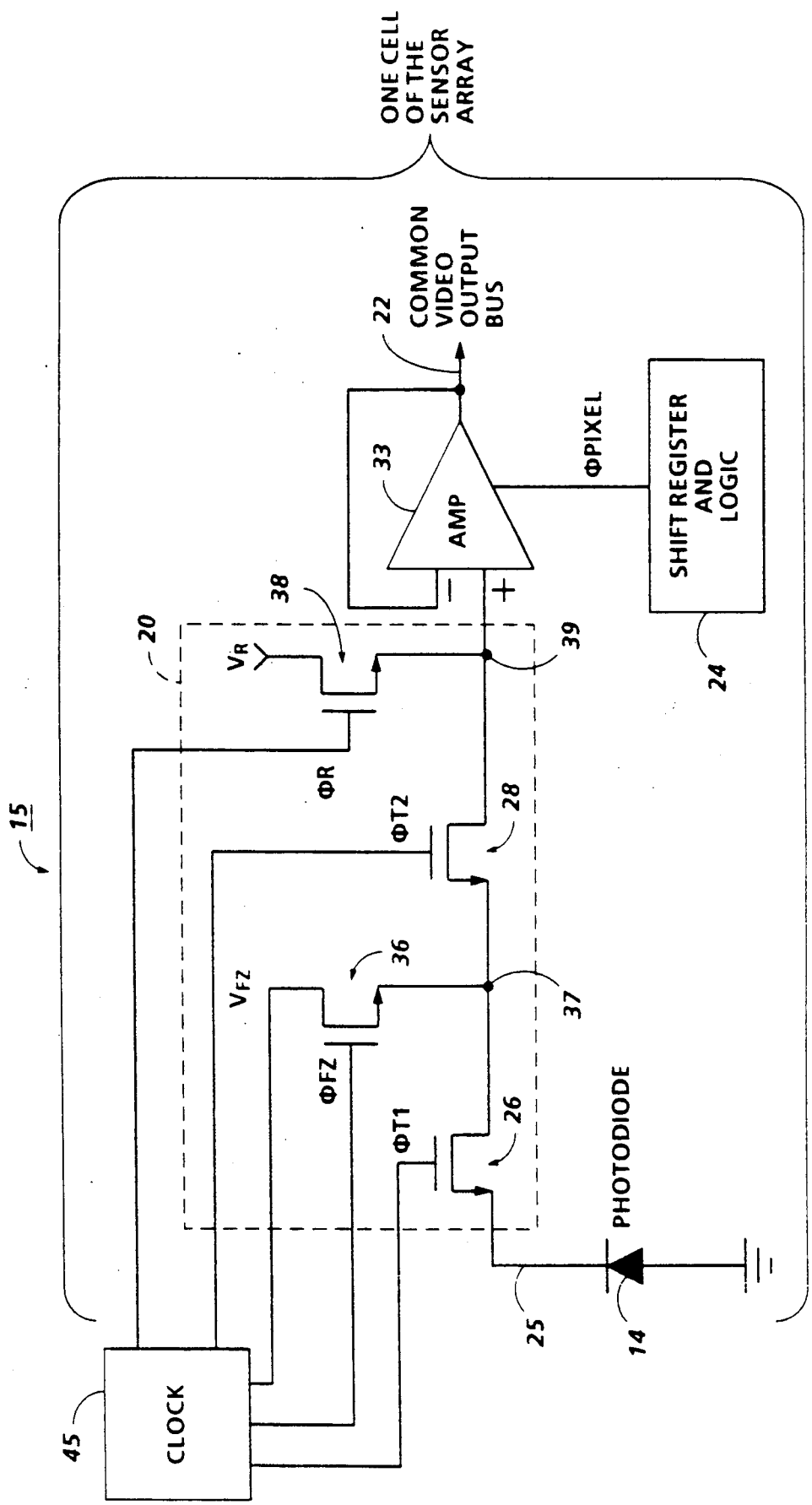
FIG. 2 is a circuit schematic showing a photosite cell and the amplifier with the improved transfer circuit of the present invention for canceling cell-to-cell variations resulting from transistor threshold mismatches.
Figure 3:
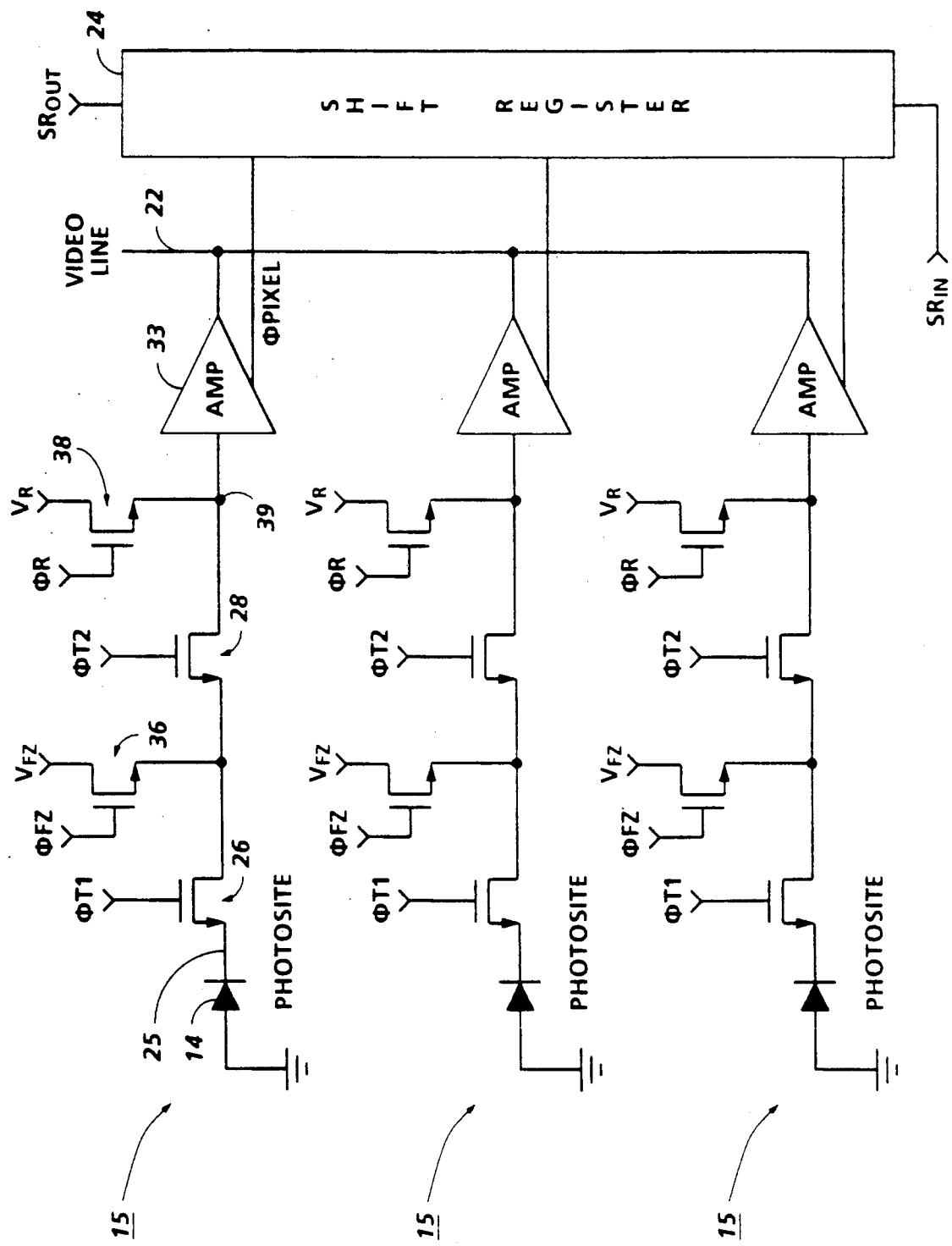
FIG. 3 is a schematic view depicting an array of photosite cells with the improved transfer circuit of the present invention.
Figure 4:
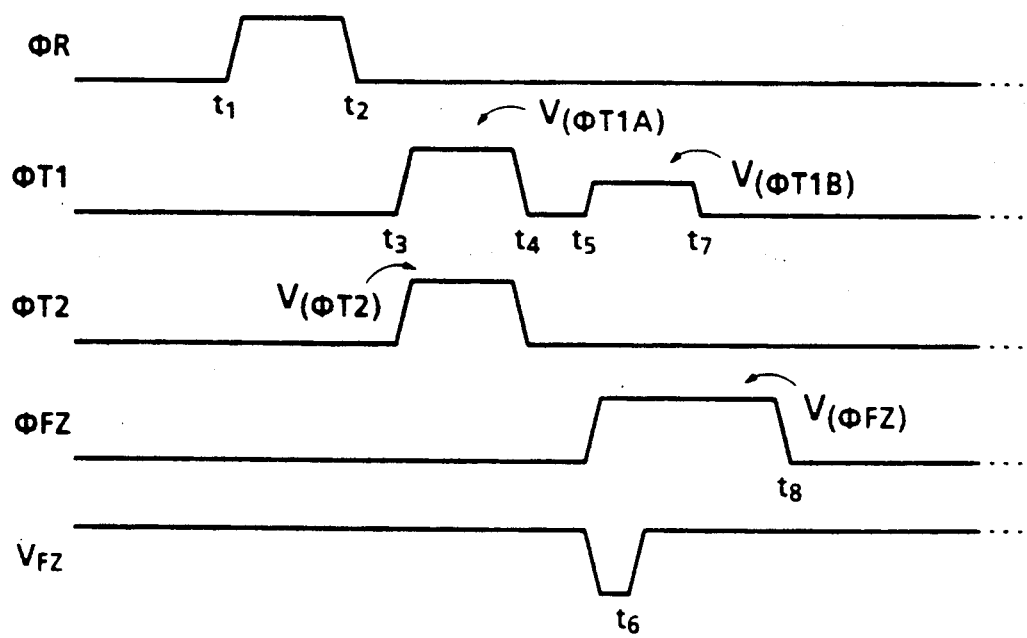
FIG. 4 is a timing diagram showing various voltage pulse waveforms for the transfer circuit shown in FIG. 2 and 3.

Referring particularly to FIGS. 2–4, the two stage transfer circuit 20 associated with each cell 15 has first and second stage transfer transistors 26, 28 for transferring the image signal charge from the photodiode 14 to amplifier 33. Transistors 26, 28 are in series with line 25 connecting one electrode of photodiode 14 with the input gate of amplifier 33. The other electrode of photodiode 14 is grounded.

A bias charge injection transistor 36 is provided to inject a bias charge, for example, an electrical fat zero $V_{FZ}$, to line 25 at middle node 37. Positioning transistor 36 between transistors 26, 28 and selecting the proper clock voltage levels allows transistor 26 to determine the surface potential during both the bias charge injection and charge transfer phases. As a result, the amount of bias charge injected is not dependent on the thresholds of transistors 36 and 26. This eliminates non-uniformities caused by transistor threshold variations from cell to cell while maintaining the high transfer efficiency provided by two stage transfer. A reset transistor 38 controls the reset voltage $V_R$ at the node 39 between transistor 28 and amplifier 33.

A suitable clock source 45 provides pulses $\Phi_R$, $\Phi_{t1}$, $\Phi_{t2}$, $\Phi_{FZ}$, and $V_{FZ}$. Pulses $\Phi_{t1}$, $\Phi_{FZ}$, and $V_{FZ}$ provide for injection of the bias charge into line 25, and pulses $\Phi_{t2}$ and $\Phi_R$ for injection of the reset voltage $V_R$ to line 25 at node 39. As will appear, pulses $\Phi t1$ and $\Phi_{t2}$ of different amplitude are provided for transferring the image signal charges from photodiodes 14 to amplifiers 33. The $\Phi_{PIXEL}$ signals for multiplexing the amplified charge output by amplifier 33 onto the common video output bus 22 are provided by shift register and logic circuitry 24.

OPERATION

In operation and referring particularly to FIGS. 2–4, during time interval $t_1$–$t_2$, pulse $\Phi_R$ actuates reset transistor 38 to apply reset voltage $V_R$ to node 39 to reset the input to amplifier 33. Subsequently, at time interval $t_3$–$t_4$, pulses $\Phi_{t2}$ actuate transistors 26 and 28 respectively of two stage transfer circuit 20 to transfer the image signal charge accumulated on the photodiodes 14 of each cell 15 to amplifiers 33. To facilitate transfer of the image signal charges, the amplitude $V(\Phi_{t1A})$ of pulse $\Phi_{t1}$ is smaller than the amplitude $V(\Phi_{t2})$ of pulse $\Phi_{t2}$.

During injection of the bias charge, at time $t_5$, the $\Phi_{t1}$ and $\Phi_{FZ}$ pulses go high while pulse $V_{FZ}$ goes low. Following preset intervals at times $t_6$, $t_7$, and $t_8$, the pulses $V_{FZ}$, $\Phi_{t1}$, and $\Phi_{FZ}$ return to their nominal level.

During bias charge injection, transistor 26 of two stage transfer circuit 20 serves as a metering gate with the amplitude $V(\Phi_{t1B})$ of the pulse $\Phi_{t1}$ applied to transistor 26 being less than the amplitude $V(\Phi_{1A})$ of the pulse $\Phi_{t1}$ applied during the image signal charge transfer cycle. Since the amount of bias charge injected is proportional to the difference between amplitudes $V(\Phi_{t1A}-V_{\Phi 1B})$, the amount of charge transferred is controlled by and is independent of the threshold voltage of the transistors.

Various voltage levels and relationships may be used. One possible choice of voltage levels used can be:

$$V(\Phi_{t1A}) < V(\Phi_{t2})$$

$$V(\Phi_{FZ}) = V(\Phi_{t2}).$$

While the invention has been described with reference to the structure disclosed, it is not confined to the details set forth, but is intended to cover such modifications or changes as may come within the scope of the following claims.

We claim:

1. A process for reducing non-uniformities at the output of image sensor chips when injecting bias charge onto the array of sensors resulting from transistor threshold mismatches, in which said sensor chips have an array of sensors; a common output bus to which the image charges accumulated by said sensors during an integration period are transferred to; and a two stage transfer circuit coupling each of said sensors on a chip with said output bus each having first and second transistors disposed in series with one another, and an amplifier between said transistor circuit and siad output bus for amplifying the image charges output by said sensors, comprising the steps of:
   a) providing a bias charge for application to a node between said first and second transistors of said two stage transfer circuits for use in setting the bias charge on said sensors;
   b) concurrently appying a bias charge transfer pulse to the first transistor of each of said two stage transfer circuits so that said first transistors function as metering gates to inject a limited amount of said bias charge on said sensors independently of the first transistors threshold voltages;
   c) applying a reset voltage to a node between the second transistor and the amplifier of each of said two stage transfer circuits at the input of said amplifiers to reset said amplifiers for transfer of the image signal charges from said sensors to said amplifiers; and
   d) thereafter applying an image signal charge transfer pulse having an amplitude different from the amplitude of said bias charge transfer pulse to said first and second transistors of said two stage transfer circuits to pass the image signal charges accumulated on said sensors to said amplifiers for amplification and transfer to said output bus.

2. The process according to claim 1 including the steps of:
   providing a bias charge transfer pulse with an amplitude less than the amplitude of said image signal charge transfer pulse.

3. The process according to claim 1 including the steps of:
   providing an image signal charge transfer pulse to the first transistors that is less than the image signal charge transfer pulse provided to said second transistors to facilitate transfer of said image signal charges to said amplifiers.

4. The process according to claim 3 including the steps of:
   providing a bias charge that is substantially equal to the amplitude of the image signal charge transfer pulse to said second transistors.

5. A sensor array with improved uniformity and reduced cell-to-cell variations resulting from transistor threshold mismatches, comprising the combination of:
   a) an array of sensors;
   b) a common output bus to which the image signal charges accumulated by said sensors during an integration period are transferred to;
   c) a two stage transfer circuit coupling each of said sensors with said output bus, said transfer circuit having first and second transistors disposed in series with one another;
   d) amplifier means between said second transistor and said output bus for amplifying the image signal charges output by said sensors;
   e) first means providing a bias charge for application to a node between said first and second transistors of said two stage transfer circuits for use in setting the bias charge on said sensors;
   f) second means providing a bias charge transfer pulse to the first transistor of each of said two stage transfer circuits so that said first transistors function as metering gates to inject a limited amount of said bias charge on said sensors independently of the first transistors threshold voltages;
   g) third means providing a reset voltage to a node between the second transistor and the amplifier of each of said two stage transfer circuits to reset said amplifiers for transfer of the image signal charges from said sensors to said amplifiers following application of said bias charge; and
   h) fourth means for subsequently appying an image signal charge transfer pulse to said first and second transistors of said two stage transfer circuits to pass the image signal charges accumulated on said sensors to said amplifiers for amplification and transfer to said output bus,
   said image signal charge transfer pulse applied by said fourth means being different than the bias charge transfer pulse provided by said second means.

6. The sensor array according to claim 5 in which the amplitude of the bias charge transfer pulse provided by said second means is less than the amplitude of the image signal transfer pulse provided by said fourth means.

7. The sensor array according to claim 5 in which the image charge transfer pulse provided by said fourth means to said second transistors is greater than the image charge transfer pulse provided by said fourth means to said first transistors to facilitate transfer of said image signal charges to said amplifiers.

8. The sensor array according to claim 7 in which the level of the bias charge provided by said first means is substantially equal to the level of the image charge transfer pulse provided by said fourth means to said second transistors.

* * * * *